United States Patent
Beyhs et al.

(10) Patent No.: US 12,204,292 B1
(45) Date of Patent: Jan. 21, 2025

(54) IDENTIFICATION OF WATCH BANDS

(71) Applicant: Apple Inc., Cupertino, CA (US)

(72) Inventors: Michael J. Beyhs, San Francisco, CA (US); Thayne M. Miller, San Jose, CA (US); Julian Quintana, San Jose, CA (US); Wesley W. Zuber, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 818 days.

(21) Appl. No.: 17/200,654

(22) Filed: Mar. 12, 2021

Related U.S. Application Data

(60) Provisional application No. 62/989,529, filed on Mar. 13, 2020.

(51) Int. Cl.
| | |
|---|---|
| *G04G 9/00* | (2006.01) |
| *A44C 5/00* | (2006.01) |
| *A44C 5/14* | (2006.01) |
| *G04G 21/02* | (2010.01) |
| *G06T 7/90* | (2017.01) |
| *G06V 20/00* | (2022.01) |
| *G09G 5/04* | (2006.01) |

(52) U.S. Cl.
CPC ......... *G04G 9/0064* (2013.01); *A44C 5/0053* (2013.01); *A44C 5/147* (2013.01); *G04G 21/02* (2013.01); *G06T 7/90* (2017.01); *G06V 20/00* (2022.01); *G09G 5/04* (2013.01); *G09G 2354/00* (2013.01)

(58) Field of Classification Search
CPC .......... G04G 17/00; G04G 17/08; A44C 5/00
See application file for complete search history.

(56) References Cited

U.S. PATENT DOCUMENTS

| | | | |
|---|---|---|---|
| 8,725,842 B1 | 5/2014 | Al-Nasser | |
| 10,691,072 B1* | 6/2020 | Johnson | G04G 9/0064 |
| 11,860,588 B1* | 1/2024 | Spencer | G06K 19/06037 |
| 2003/0013947 A1* | 1/2003 | Frattarola | A61B 8/00 |
| | | | 600/322 |
| 2013/0100055 A1* | 4/2013 | Lauder | G06F 3/041 |
| | | | 345/173 |
| 2015/0359304 A1* | 12/2015 | Thomas | A44C 5/0053 |
| | | | 63/3 |
| 2016/0192526 A1* | 6/2016 | Gao | G06F 1/1632 |
| | | | 361/679.01 |

(Continued)

FOREIGN PATENT DOCUMENTS

WO WO 2015/047363 4/2015

*Primary Examiner* — Edwin A. Leon
*Assistant Examiner* — Jason M Collins
(74) *Attorney, Agent, or Firm* — BAKERHOSTETLER

(57) ABSTRACT

A watch can include a watch body and a band for securing the watch to the user. The watch body can detect an identification of the band or combination of band portions, which can serve as an input to initiate actions performed by the watch body. For example, a type, model, color, size, or other characteristic of a band can be determined and used to select a corresponding action performed by the watch body. Identification of the band can be performed by components of the watch body that also serve other purposes. The watch body can respond to the identification of a particular band by performing particular functions, such as changing an aspect of a user interface or altering settings of the watch body.

18 Claims, 8 Drawing Sheets

(56) References Cited

U.S. PATENT DOCUMENTS

| | | | |
|---|---|---|---|
| 2016/0198816 A1* | 7/2016 | Ogborne | G07C 9/00 |
| | | | 324/207.2 |
| 2016/0262028 A1* | 9/2016 | Reddy | G06F 1/163 |
| 2017/0316657 A1* | 11/2017 | de Jong | G06F 1/1677 |
| 2018/0295951 A1* | 10/2018 | Keller | A44C 5/22 |
| 2018/0348814 A1* | 12/2018 | Meen | G06F 3/1454 |
| 2019/0015045 A1* | 1/2019 | Li | G04C 3/002 |
| 2020/0033815 A1* | 1/2020 | Bushnell | G04G 21/06 |

* cited by examiner

IDENTIFICATION OF WATCH BANDS

CROSS-REFERENCE TO RELATED APPLICATION

This application claims the benefit of U.S. Provisional Application No. 62/989,529, entitled "IDENTIFICATION OF WATCH BANDS," filed Mar. 13, 2020, the entirety of which is incorporated herein by reference.

FIELD

The described embodiments relate generally to wearable electronic devices. More particularly, the present embodiments relate to identification of bands for watches and corresponding actions based on the identification.

BACKGROUND

Portable electronic devices, including watches, have become increasingly popular, and the features and functionality provided by portable electronic devices continue to expand to meet the needs and expectations of many consumers. With some wearable electronic devices, the component parts are modular and exchangeable. For example, electronic wristwatches can allow a user to select one of a variety of bands for securing the electronic components to the user. The user can select and exchange bands based on a preference for certain characteristics of a given band.

However, some traditional portable electronic devices, particularly wearable electronic devices, may have relatively limited functionality or are only able to perform a specialized set of functions or tasks. Some portable electronic devices operate without regard to the band selected for use therewith. The embodiments described herein are directed to a wearable device that provides a wide range of functionality that can be influenced by selection of a band.

BRIEF DESCRIPTION OF THE DRAWINGS

The disclosure will be readily understood by the following detailed description in conjunction with the accompanying drawings, wherein like reference numerals designate like structural elements, and in which.

Figure 1:
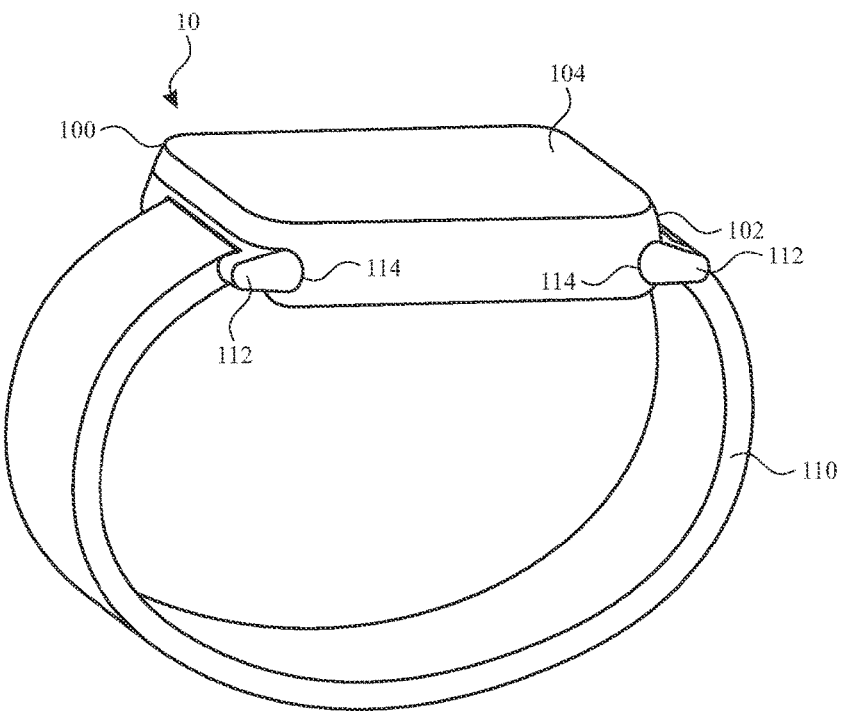
FIG. 1 illustrates a perspective view of a watch.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

The following disclosure relates to identification of a band for use with an electronic device. The identification can serve as an input to initiate actions performed by the electronic device. For example, a type, model, color, size, or other characteristic of a band can be determined and used to select a corresponding action performed by the electronic device.

A watch can include a watch body and a band for securing the electronic device to the user. In many traditional devices, the electronic device does not interact with or even identify the band that is used in conjunction with the electronic device. In other devices, the band may provide certain functionality to supplement the functionality of the electronic device. However, such bands often require a power source, such as from an integrated battery or from the battery of the electronic device. Furthermore, such bands often require a robust communication link with the electronic device for bidirectional communication. These features impose significant design considerations that increase the cost and complexity of the parts.

In contrast to traditional devices, the band identification capabilities described herein provide simple and elegant solutions that allow an electronic device to readily identify a band. In some embodiments of the present disclosure, identification of the band can be achieved by a variety of mechanisms. For example, identification of the band can be performed by components of the electronic device that also serve other purposes. Existing sensors, communication elements, and/or detectors can be used to detect and identity a band provided to the electronic device. Accordingly, identification of a band with the electronic device can be achieved without adding dedicated components to the electronic device. Furthermore, identification can be achieved without sacrificing power to the band and without requiring a bidirectional communication link with the band.

A selection of a certain band can influence operation of the electronic device in a variety of ways. For example, the electronic device can respond to the identification of a particular band by performing particular functions, such as changing an aspect of a user interface or altering settings of the electronic device. Such functions can be readily executed by the electronic device upon identification of the band, such that user input is not required. Accordingly, a user's experience with the electronic device can be enhanced based on the user's selection of a particular band.

These and other embodiments are discussed below with reference to FIGS. 1-15. However, those skilled in the art will readily appreciate that the detailed description given herein with respect to these figures is for explanatory purposes only and should not be construed as limiting.

FIG. 1 illustrates a perspective view of a watch 10. The watch 10 can include a watch body 100 and a band 110. As shown, the watch body 100 includes a housing 102 that supports a display 104. The watch body 100 can be worn on a user's wrist and secured thereto by the band 110. The band 110 includes lugs 112 at opposing ends of the band that fit within respective recesses or channels 114 of the housing 102 and allow the band 110 to be removably attached to the housing 102. The lugs 112 may be part of the band 110 or may be separable (and/or separate) from the band 110. Generally, the lugs 112 may lock into the channels 114 and thereby maintain connection between the band 110 and the housing 102. The user may release a locking mechanism (not shown) to permit the lugs 112 to slide or otherwise move out of the channels 114. In some watches, the channels 114 may be formed in the band 110 and the lugs may be affixed or incorporated into the housing 102. While lugs 112 and channels 114 are illustrated, it will be recognized that other attachment elements, such as locks, snaps, clasps, threads, and pins can be included on the band 110 for securely attaching to the watch body 100.

Figure 2:
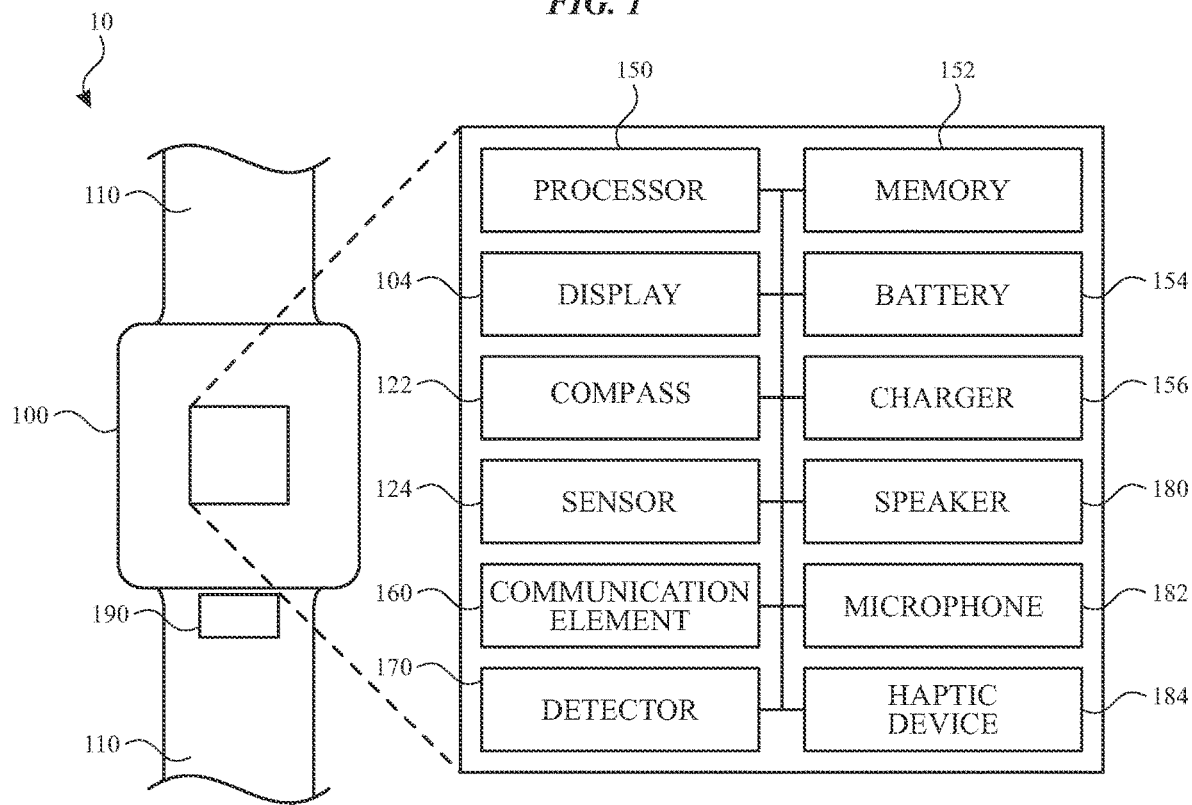
FIG. 2 illustrates a simplified system diagram of a watch.

As shown in FIG. 2, the band 110 can include an identification element 190 that is detectable by one or more components of the watch body 100. Features of the identification element 190 can be selected to achieve detection by the watch body 100, as described further herein. For example, the identification element 190 can include a feature on a surface of the band 110 and/or be embedded within the structure of the band 110. The identification element 190 can be positioned on or along any portion of the band 110 to facilitate detection. For example, the identification element 190 can be located near an end of the band 110 (e.g., at or near a lug 112). Alternatively or in combination, the identification element 190 can be located on a side of the watch 10 that is opposite the watch body 100. The identification element 190 can be used to determine information about the band 110, such as a type, characteristic, feature, or identity of the band 110. Subsequent actions by the watch body 100 can correspond to the determined information.

As further shown in FIG. 2, the watch body 100 can include components that support the operations thereof. Such operations can include identification of a band 110, actions based on the identification, and other operations that are independent of the identification. In some embodiments, components used for operations independent of the identification of the band 110 can also be used for identification. Such components are described below with reference to FIG. 2.

In some embodiments, as shown in FIG. 2, the watch body 100 includes a processor 150, memory 152, a power source 154, and/or a charger 156 for providing power to the power source 154.

The processor 150 can control or coordinate some or all of the operations of the watch body 100. The processor 150 can communicate, either directly or indirectly with substantially all of the components of the watch body 100. For example, a system bus or signal line or other communication mechanisms can provide communication between the processor 150, the memory 152, the power source 154, as well as other components. The processor 150 can be implemented as any electronic device capable of processing, receiving, or transmitting data or instructions. As described herein, the term "processor" is meant to encompass a single processor or processing unit, multiple processors, multiple processing units, or other suitably configured computing element or elements.

The memory 152 can store electronic data that can be used by the watch body 100. For example, a memory can store electrical data or content such as, for example, audio and video files, documents and applications, device settings and user preferences, timing and control signals or data for the haptic device 184, data structures or databases, and so on. The memory 152 can be configured as any type of memory. By way of example only, the memory can be implemented as random access memory, read-only memory, Flash memory, removable memory, or other types of storage elements, or combinations of such devices.

A power source 154 can be implemented with any device capable of providing energy to the watch body 100. For example, the power source 154 can be a battery and/or a connection cable that connects the charger 156 to another power source such as a wall outlet. In other examples, wireless power can be used.

In some embodiments, as shown in FIG. 2, the watch body 100 can include components for interacting with a user. In some embodiments, the watch body 100 includes a display 104, a speaker 180, a microphone 182, and/or a haptic device 184.

The display 104 may provide an image or video output for the watch body 100. The display 104 may also provide an input surface for one or more input devices such as a touch sensing device, force sensing device, temperature sensing device, and/or a fingerprint sensor. The display 104 may be any size suitable for inclusion at least partially within the housing 102 of the watch body 100 and may be positioned substantially anywhere on the watch body 100. Other input devices can be provided for operation by a user. For example, one or more buttons, dials, crowns, switches, or other devices can be provided for receiving input from a user.

The haptic device 184 can be implemented as any suitable device configured to provide force feedback, vibratory feedback, tactile sensations, and the like. For example, in one embodiment, the haptic device 184 may be implemented as a linear actuator configured to provide a punctuated haptic feedback, such as a tap or a knock.

In some embodiments, as shown in FIG. 2, the watch body 100 can include components that facilitate detection of an identification element 190, among other functions. In some embodiments, the watch body 100 includes a sensor 124 (e.g., biometric sensors, environmental sensors, etc.), a communication element 160, and/or a detector 170. As used herein, "a sensor" can include or be operably connected to any component that is capable of facilitating detection of an identification element 190. A sensor can include or be operably connected to the sensor 124, the communication element 160, and/or the detector 170. As described herein, components of the watch body 100 can be used as sensors for detection of an identification element 190, yet also have other functions apart from detection of the identification element 190.

The watch body 100 can include a compass 122. The compass 122 can include a magnetometer for detecting a presence and direction of a magnetic field. The compass 122 can be configured to detect a magnetic field of the Earth, and thereby provide information that can be used to determine the orientation of the watch body 100 with respect to magnetic poles of the Earth. The compass 122 can also be operated to detect magnetic fields from other sources, such as the identification element 190 of the band 110, as discussed further herein.

The watch body 100 may also include one or more sensors 124 positioned substantially anywhere on the watch body 100. The sensor or sensors 124 may be configured to sense substantially any type of characteristic such as, but not limited to, images, pressure, light, touch, force, temperature, position, motion, and so on. For example, the sensor(s) 124 may be a photodetector, a temperature sensor, a light or optical sensor, an atmospheric pressure sensor, a humidity sensor, a magnet, a gyroscope, an accelerometer, and so on. In other examples, the watch body 100 may include one or more health sensors. In some examples, the health sensors can be disposed on a bottom surface of the housing of the watch body 100, as discussed further herein. Other sensors 124 or detectors 170 can be provided with similar or different functionality.

The communication element 160 can facilitate transmission of data to or from other electronic devices across standardized or proprietary protocols. For example, a communication element 160 can transmit electronic signals via a wireless and/or wired network connection. Examples of wireless and wired network connections include, but are not limited to, cellular, Wi-Fi, Bluetooth, infrared, RFID and Ethernet. The communication element 160 can communicate with or sense the band 110 or another device, as described further herein.

Figure 3:
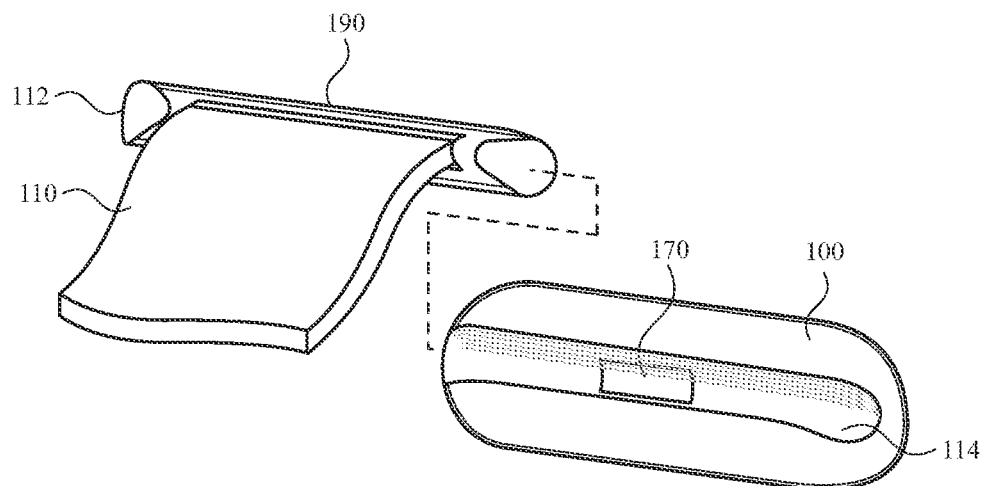
FIG. 3 illustrates a perspective view of a watch prior to insertion of a band into a watch body.
Figure 4:
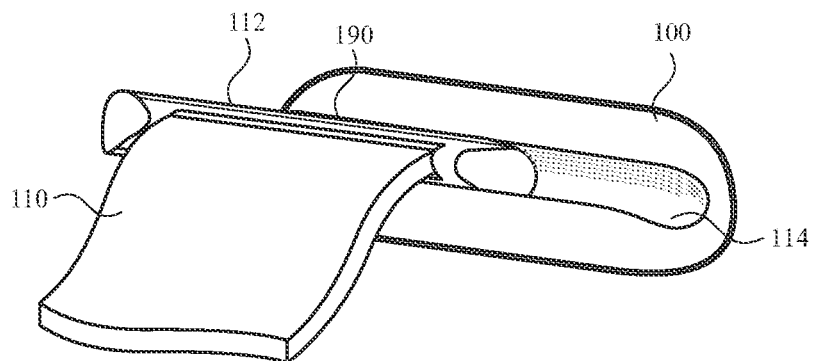
FIG. 4 illustrates a perspective view of the watch of FIG. 3, during insertion of the band into the watch body.
Figure 5:
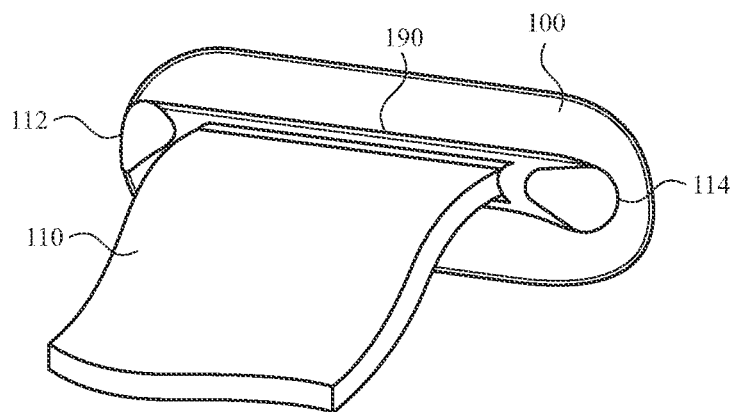
FIG. 5 illustrates a perspective view of the watch of FIG. 3, after insertion of the band into the watch body.

Referring now to FIGS. 3-5, the watch body 100 can detect an identification element 190 of a band 110 by operating one or more detectors 170. As shown in FIGS. 3-5, a lug 112 can include an identification element 190. The detector 170 of the watch body 100 can be located at or near the channel 114 into which the lug 112 is received. As shown in FIGS. 4 and 5, as the lug 112 is inserted into the channel 114, the identification element 190 is brought into alignment with and close proximity to the detector 170. While the identification element 190 is shown in FIGS. 3-5 as being at the lug 112, it will be recognized that the identification element 190 can be located at other positions. For example, the identification element 190 can be at any location at, on, or within the band 110, including any distance away from the lug 112.

In some embodiments, a detector 170 can be used to detect the identification element 190 before, during, and/or after the band 110 is attached to the watch body 100. For example, the detector 170 can be operated to detect identification element 190 of the band 110 while the band is not connected to the watch body (e.g., with the lug 112 not inserted into the channel 114), as shown in FIG. 3. By further example, the detector 170 can be operated to detect identification element 190 of the band 110 while the band is being connected to the watch body (e.g., while the lug 112 is moving into the channel 114), as shown in FIG. 4. By further example, the detector 170 can be operated to detect identification element 190 of the band 110 after the band is connected to the watch body (e.g., with the lug 112 inserted into the channel 114), as shown in FIG. 5.

In some embodiments, the detector 170 can include one or more contact pins within the channel 114 for providing an electrically conductive pathway to the identification element 190. Multiple pins can be provided to conduct power, provide a connection to ground, and transmit signals. The pins of the detector 170 can retract within the channel 114 to accommodate passage of the lug 112.

In some embodiments, the detector 170 can optically sense the identification element 190 on the lug 112 or another portion of the band 110. A light source can be provided to facilitate optical sensing by the detector 170. For example, the detector can include or be accompanied by a light source that illuminates the identification element 190, and the detector can optically detect the light reflected off of the identification element 190.

For example, the band 110 can be positioned so that the identification element 190 is within a light path of a light source and within a field of view of the detector 170. Light emitted from the light source can be reflected off of the identification element 190. For example, the identification element 190 can include a pattern on the band 110 that reflects the wavelength(s) of light emitted from the light source. The light can be infrared light, visible light, or another wavelength value or range. Where the identification element 190 reflects light outside of the visible spectrum, it can be non-visible to a user. For example, the identification element 190 can include ultraviolet-reflective ink. As such, the identification element 190 can provide identification capabilities without being noticeable by a user.

By further example, the identification element 190 can include a symbol, such as a barcode, including a machine-readable representation of information in the form of one or more patterns. The symbol may be formed as patterns of dark (e.g., black) and light (e.g., white) bars, circles, dots or other shapes. Other patterns are contemplated, such as patterns of dots, concentric circles and the like. Other examples of barcodes include Universal Product Codes (UPCs), Code 39 barcodes, Code 128 barcodes, PDF417 barcodes, EZcode barcodes, DataMatrix barcodes, QR Codebarcodes, or barcodes that utilize any other type of barcode symbology. A 1D sensor or a 2D sensor can be used to capture images of adequate resolution (e.g., pixels) to detect the identification element 190 (e.g., barcode). The depth of focus of the sensor can be arranged so that the barcode is in focus when the band is swiped past the detector 170.

The detector 170 can be configured to perform barcode scanning. In particular, the detector 170 can capture an image of the identification element 190 and use digital image processing techniques to decode the barcode. During a detection operation, the watch body 100 may prompt a user to line up the detector 170 with the identification element 190 in a particular manner, such as aligning the identification element 190 in the center of an image captured by the detector 170 and displayed on the display 104.

In some embodiments, the detector 170 can directly detect an intrinsic characteristic of a band 110. For example, various bands 110 can be of different materials, constructions, textures, and/or colors. The detector 170 can distinguish one or more characteristics of a given band 110 from those of another band 110. The detector 170 can optically detect certain characteristics, such as color and reflectivity, of a band 110 and identify the band 110 based on whether it satisfies expected criteria relating to the detected characteristics. For example, the detector 170 can distinguish the color and reflectivity of a stainless steel band from the color and reflectivity of a brown leather band. Thereby, the watch body 100 can identify each of the bands 110 and perform corresponding actions.

In some embodiments, the detector 170 include a magnetic field sensor (e.g., compass, magnetometer, Hall Effect sensor, etc.) and the identification element 190 can include one or more magnets. For example, the detector 170 can detect the magnitude, orientation, or other characteristic of a magnetic field emitted by the identification element 190. The detected characteristic can have a distinct signature that is unique to the identification element 190. Thereby, the watch body 100 can identify the band 110 and perform corresponding actions.

By further example, where multiple magnets are included, the identification element 190 can include an arrangement of the magnets (e.g., different north-south orientations) that is distinct from the arrangement of another identification element 190 of a different band 110. The magnets can be arranged across the lug 112, such that insertion of the lug 112 into the channel 114 allows each of the magnets to pass across the detector 170. Such action can automatically activate sensing by the detector 170. The detector 170 can detect each of the magnets and determine an arrangement (e.g., north-south) thereof based on the magnetic fields of each magnet. The combined arrangement can have a distinct signature that is unique to the identification element 190. Thereby, the watch body 100 can identify the band 110 and perform corresponding actions.

The detector 170 of the watch can include or operate in concert with a compass of the watch. For example, the same compass that is operated to detect a magnetic field of the Earth can be operated to detect the identification element 190. The presence of a magnetic field from the identification element 190 can be detected by the same compass that is then calibrated to detect the magnetic field of the Earth. Likewise, the removal and/or absence of the magnetic field from the identification element 190 can be detected by the same compass that is then calibrated to detect the magnetic field of the Earth In some embodiments, the watch body 100 can detect an identification element 190 of a band 110 by using a detector that applies a communication protocol. Wireless or wired communication can be performed, at least in part, by a detector 170 that includes or operates in concert with a communication element (e.g., communication element 160) of the watch body 100. Communication between the band 110 and the watch body 100 can employ a short-range communication method, such as near field communication ("NFC"), radio-frequency identification ("RFID"), Bluetooth, Wi-Fi, Wi-Fi Direct, short-range 802.11, and high frequency focused beams such as 60 GHz. Alternatively or additionally, communication between the band 110 and the watch body 100 can employ a high frequency communication method, such as WirelessHD, WiGig, and Wi-Fi IEEE 802.1 lad. Alternatively or additionally, communication between the band 110 and the watch body 100 can be with ultra-wideband ("UWB"), using low energy levels for short-range, high-bandwidth communications over a large portion of the radio spectrum (e.g., >500 MHz).

For example, the watch body 100 can be placed near the band 110. The watch body 100 and the band 110 can include a wireless system that is configured to enable one-way or two-way communications. The one- or two-way communication may include an identification of the band 110 and the watch body 100 to initiate a data connection between the two devices. The user initiates a communication between the watch body 100 and the band 110 by placing the watch body 100 near the identification element 190 (e.g., a tag). In some embodiments, the watch body 100 is configured to automatically detect the presence of the identification element 190 and initiate an identification process or routine. The system may include a unique identifier or signature that may be used to authenticate the identity of the band 110.

Figure 6:
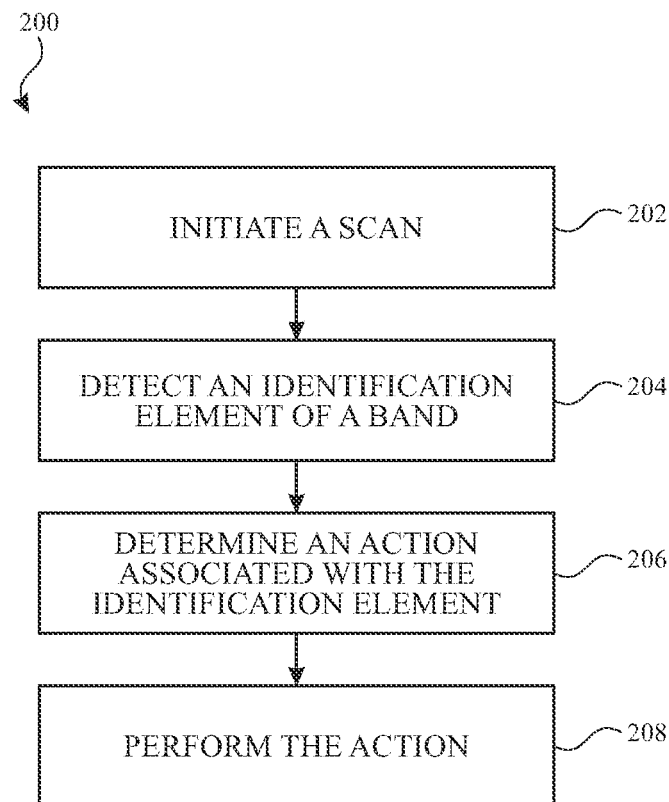
FIG. 6 illustrates a flow chart of a process.

Referring now to FIG. 6, a method 200 can be performed by a watch body 100 to interact with a band 110. In an operation 202, the watch body 100 can initiate a scan for an identification element. The watch body 100 can be placed into a scanning mode based on manual and/or automated initiation. For example, the user can place the watch body 100 into a scanning mode by providing manual inputs to the watch body 100. For at least a limited period of time thereafter, the watch body 100 can activate its components to scan for the identification element 190 of a band 110. Alternatively or additionally, the watch body 100 can automatically activate its components after it senses the presence of an identification element 190, for example as described above. Additionally or alternatively, the electronic device can initiate a scan for an identification element upon detection that the electronic device is worn by a user. For example, when the electronic device detects that it is being worn (e.g., based on proximity to a user as can be sensed by a sensor) after a period of not being worn, the electronic device can initiate a scan to detect the identification element of any band present. By further example, the electronic device can detect the presence of a band based on sensed changes, such as a change in impedance or inductance of a coil when the band is inserted into the electronic device, as discussed further herein. Such changes can be used to initiate a scan. Additionally or alternatively, the electronic device can initiate scans periodically or based on a predetermined schedule.

In an operation 204, the watch body 100 can detect an identification element 190 of a band 110. Examples of components and mechanisms for detecting the identification element 190 are described above. One of more of these components and/or mechanisms can be applied to effectively detect the identification element 190. Once the identification element 190 has been detected, a record thereof can be stored within a memory 152 of the watch body 100. The identification element 190 can be an indicator of a feature of the band 110. For example, the identification element 190 can indicate a type, model, color, size, or other characteristic of the band 110. Where the identification element 190 indicates one characteristic (e.g., model) of the band 110, other characteristics (e.g., color, size) can be inferred.

The identification can serve as an input to determine an action to be performed by the watch body 100. In an operation 206, the watch body 100 can determine an action associated with the identification element 190. Each of a variety of identification elements 190 corresponding to different bands 110 can be recorded in the memory 152 of the watch body 100. Each of the recorded identification elements 190 can have associated therewith a corresponding action. The record of identification elements 190 and associated actions can be in the form of a table, array, or other data structure. When a given identification element 190 is detected, it can be compared with the recorded identification elements 190 to find a match and determine the corresponding action. While the foregoing discussion relates to referencing memory 152 onboard the watch body 100, it will be recognized that the watch body 100 can reference another database apart from the watch body 100. The association of identification elements 190 and corresponding actions can be preprogrammed, user-selected, or a result of machine-learning based on prior usage with one or more bands 110.

In an operation 208, the watch body 100 can perform the action that has been determined to be associated with the identification element 190. For example, the recorded action corresponding to the detected identification element 190 can include instructions for execution by the processor 150 and/or other components of the watch body 100. Alternatively or additionally, the action can include causing another device, apart from the watch body 100, to execute instructions. The action can be performed automatically upon identification of a band 110. Additionally or alternatively, the watch body 100 can provide a prompt requesting user confirmation of the action, and the action can be performed after user confirmation is received. Additionally or alternatively, a user can manually override or modify the action.

Various examples of actions are discussed below. Actions performed by the watch body 100 in response to detection of an identification element 190 include influencing regular operation of the watch body 100. For example, the regular operation of the watch body 100 can be maintained with additional or altered features based on the selected band 110. As such, the user's experience with the watch body 100 during its regular operation is enhanced.

In some embodiments, upon identifying a particular band 110, the watch body 100 provides a feature of a visual user interface that corresponds to a characteristic of the band 110. For example, the watch body 100 can display on the display 104 a feature that is substantially the same color as the band 110. Alternatively or additionally, the feature can be a similar color, a matching color, or a complementary color. The feature can be any visible feature of the display 104. Examples of features include watch hands, text, numbers, symbols, graphics, charts, markers, or any displayed item. One, some, or all of the features visible on the display 104 can be altered based on the color of the identified band 110. By further example, the watch body 100 can display on the display 104 a feature that is associated with the band 110, regardless of color selection. For example, displayed information, watch faces, menu items, and selectable icons can be selected based on the selection of band 110.

In some embodiments, upon identifying a particular band 110, other settings of the watch body 100 can be modified. A band 110 can be associated with an activity that is supported by the watch body 100. For example, an exercise band can be worn when a user is exercising. Upon identification of the exercise band, actions conducive to an exercise session can be performed by the watch body 100. For example, the watch body 100 can display particular information, track activity of the user, take a biometric reading, record a location of the user, launch an activity tracking app, and/or modify notifications settings (e.g., to be more prominent). By further example, a formal band can be worn in a more formal setting. Upon identification of the formal band, actions conducive to a formal setting can be performed by the watch body 100. For example, the watch body 100 can display particular information, modify notifications settings (e.g., to be less prominent), provide reminders to the user, and/or record a location of the user.

Actions performed by the watch body 100 in response to detection of an identification element 190 include actions outside of the regular operation of the watch body 100. For example, the watch body 100 can perform actions that are only available when a particular band 110 is detected. As such, the user's experience with the watch body 100 is expanded with the selection of bands 110.

Figure 7:
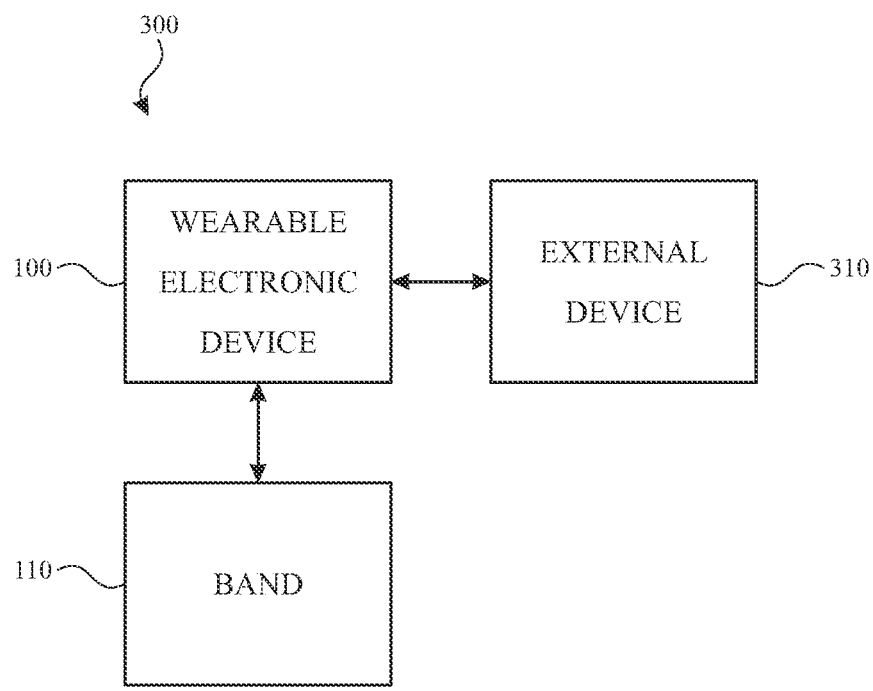
FIG. 7 illustrates a block diagram of a system.

In some embodiments, a band 110 can include an identification element 190 that provides authorization for otherwise unavailable actions. For example, a band 110 can facilitate redemption of items of value. The band 110 can be used with the watch body 100 to redeem items of value, such as credit, gift cards, funds, cash, prizes, digital media, access to content (e.g., online content), goods, and/or services. The identification element 190 can provide information to the watch body 100 for authorizing redemption of an item of value. For example, the identification element 190 can include a code that is verifiable by an external device. As shown in FIG. 7, a system 300 can manage the redemption. The watch body 100 can identify a band 110 and communicate with an external device 310. Information from the identification element 190 can be transmitted from the watch body 100 to the external device 310. The external device 310 can verify the information and authorize redemption of an item of value. The external device 310 can further manage the redemption by executing a transfer to an account associated with the watch body 100. Bands 110 that facilitate redemption of items of value can be provided by vendors, retailers, service providers, or entities that manage the redemption process. The bands 110 can be provided, exchanged, and transferred for sale or as gifts based on the value of the redeemable items. The bands 110 can be provided as promotional items in conjunction with an event. For example, bands 110 can be provided at a festival, convention, conference, concert, or reunion, to provide attendees possessing the bands 110 with access items of value that are associated with the event. Each attendee can access the items of value by using the bands 110 with their watch bodies 100.

In some embodiments, a band 110 and a watch body 100 can interact and operate in a manner that is not necessarily perceivable by a user. For example, a watch body 100 can track usage of one or more bands 110. The tracked usage information includes dates, times, durations, locations, activities, biometrics of the user, and/or environmental features in relation to periods before, during, and/or after usage of each band 110. The tracked usage information can be collected during a background process of the watch body 100. The tracked usage information can be output to a user or uploaded to an external device for analysis. The tracked usage information can be used for machine learning in relation to how each band 110 is used.

The watch body 100 can perform a variety of other actions upon identification of a band 110. It will be recognized that the detection of an identification element 190 can be followed by any associated action that can be performed by the watch body 100. For example, where the watch body 100 has the required capabilities, the watch body 100 launches an app, opens a website, starts a timer, displays a message, provides an alert, communicates with another device, and/or other functions.

Figure 8:
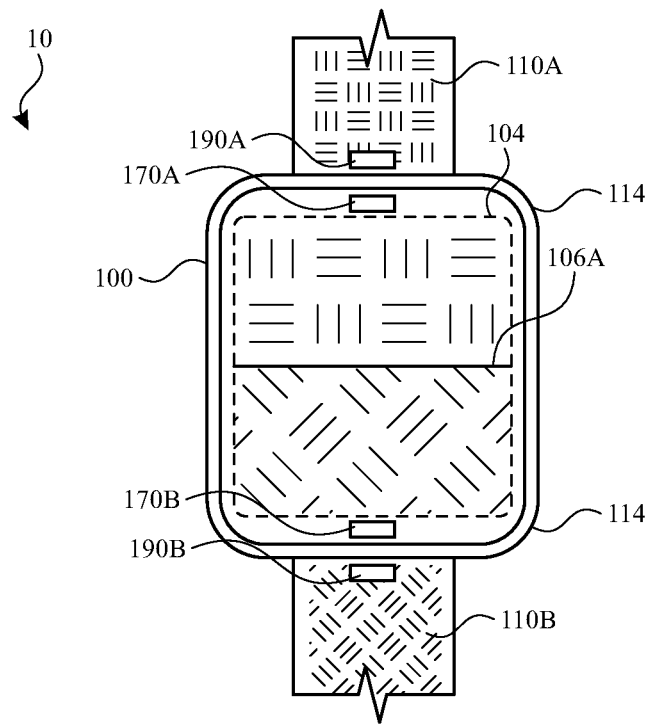
FIG. 8 illustrates a front view of a portion of a watch having first and second band portions.
Figure 9:
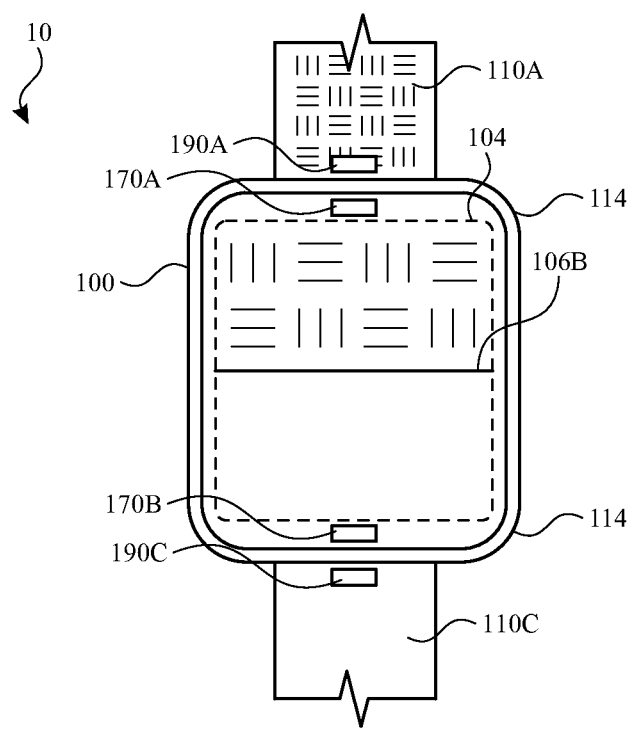
FIG. 9 illustrates a front view of the watch of FIG. 8 having first and third band portions.
Figure 10:
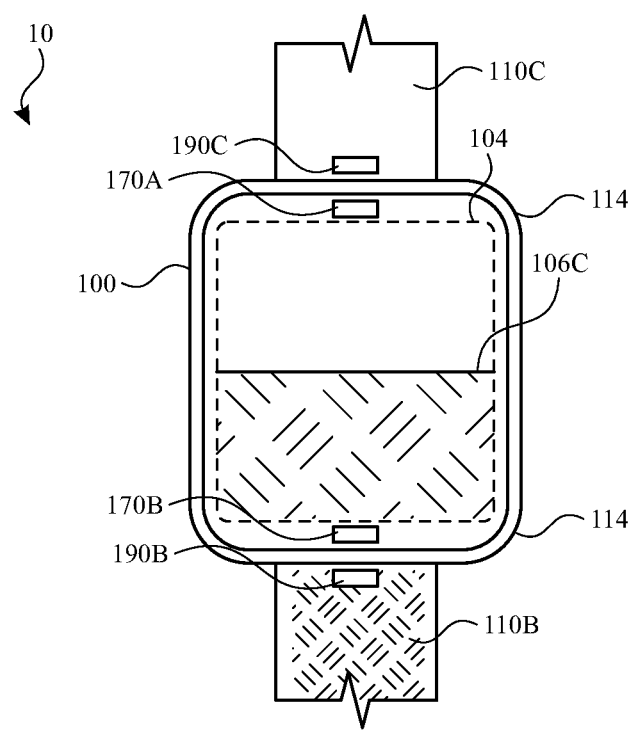
FIG. 10 illustrates a front view of the watch of FIG. 8 having second and third band portions.

Referring now to FIGS. 8-10, a watch can perform different actions when each of a variety of band combinations is detected. For example, a user can be provided with a variety of bands or band portions for attachment to a watch body, and the watch can detect the selected combination of band portions and provide an action in response that is unique to the selected combination. Accordingly, the action can be customized to the selected combination, and/or the selection of watch band portions can be used to achieve functions that would otherwise be unavailable to the user.

For example, as shown in FIG. 8, a first band portion 110A and a second band portion 110B can each be attached to a corresponding one of different (e.g., opposing) sides of the watch body 100 (e.g., at a given channel 114). The first band portion 110A can have a characteristic that is the same as or different from a characteristic of the second band portion 110B. Such characteristics can include a type, model, color, material, size, output, or other characteristic of the corresponding band portion. The characteristic can be detectable or undetectable to a user. A first detector 170A on a first side of the watch body 100 can detect a first identification element 190A of the first band portion 110A, and a second detector 170B on a second side of the watch body 100 can detect a second identification element 190B of the second band portion 110B. Based on and in response to these detections, the watch body can perform an action. An example of such an action includes providing a first output 106A on the display 104 of the watch body 100. The first output 106A can optionally include a visual feature with a characteristic that corresponds to a characteristic of the first band portion 110A and a characteristic that corresponds to a characteristic of the second band portion 110B. Further examples include providing other outputs to a user, initiation a function, terminating a function, communicating with another device, and the like.

By further example, as shown in FIG. 9, the first band portion 110A and a third band portion 110C can each be attached to a corresponding one of the different (e.g., opposing) sides of the watch body 100 (e.g., at a given channel 114). The first band portion 110A can have a characteristic that is the same as or different from a characteristic of the third band portion 110C, and the third band portion 110C can have a characteristic that is different from a characteristic of the second band portion 110B. The first detector 170A on the first side of the watch body 100 can detect the first identification element 190A of the first band portion 110A, and the second detector 170B on the second side of the watch body 100 can detect a third identification element 190C of the third band portion 110C. Based on and in response to these detections, the watch body can perform an action. An example of such an action includes providing a second output 106B on the display 104 of the watch body 100. The second output 106B can optionally include a visual feature with a characteristic that corresponds to a characteristic of the first band portion 110A and a characteristic that corresponds to a characteristic of the third band portion 110C. Further examples include providing other outputs to a user, initiation a function, terminating a function, communicating with another device, and the like. It will be understood that the action can be different than the action taken when the first band portion 110A and the second band portion 110B are detected.

By further example, as shown in FIG. 10, the second band portion 110B and the third band portion 110C can each be attached to a corresponding one of the different (e.g., opposing) sides of the watch body 100 (e.g., at a given channel 114). The second band portion 110B can have a characteristic that is the same as or different from a characteristic of the third band portion 110C, and the second band portion 110B and the third band portion 110C can have a characteristic that is different from a characteristic of the first band portion 110A. The first detector 170A on the first side of the watch body 100 can detect the third identification element 190C of the third identification element 190C, and the second detector 170B on the second side of the watch body 100 can detect a second identification element 190B of the second band portion 110B. Based on and in response to these detections, the watch body can perform an action. An example of such an action includes providing a third output 106C on the display 104 of the watch body 100. The third output 106C can optionally include a visual feature with a characteristic that corresponds to a characteristic of the second band portion 110B and a characteristic that corresponds to a characteristic of the third band portion 110C. Further examples include providing other outputs to a user, initiation a function, terminating a function, communicating with another device, and the like. It will be understood that the action can be different than the action taken when both the first band portion 110A and the second band portion 110B are detected and/or when both the first band portion 110A and the third band portion 110C are detected.

As such, at least certain actions can be performed only when the corresponding combination of band portions is provided and detected. Accordingly, the user can unlock certain functions by providing the corresponding combination of band portions. The user can acquire, collect, exchange, and trade band portions so that a given combination is available along with its corresponding action performed by the watch. Such interactions can initiated by a user as part of a game, social activity, exercise program, or other event.

Figure 11:
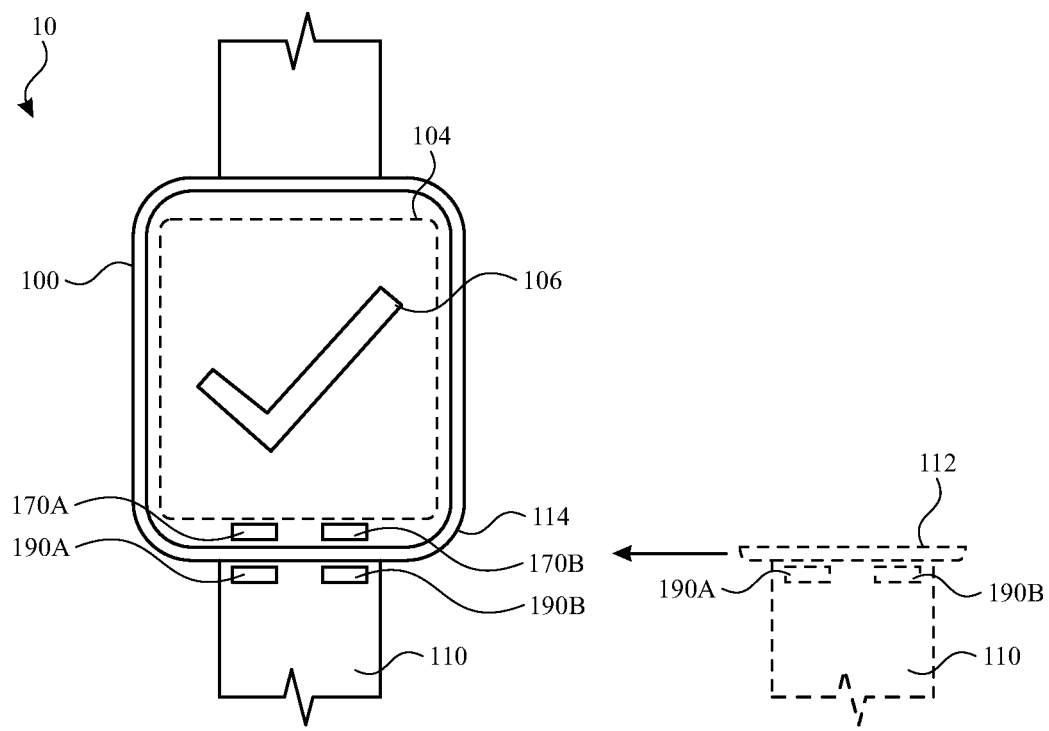
FIG. 11 illustrates a front view of a portion of a watch with a band in a first orientation for insertion into a watch body.

Referring now to FIG. 11, multiple detectors can operate in concert to detect identification elements of a band with reduced power consumption. The multiple detectors can cooperatively provide frequent detection of a band along with accurate and effective detection of the identity of the band.

For example, as shown in FIG. 11, a band 110 can include a first identification element 190A and a second identification element 190B. When the band 110 is attached to the watch body 100 (e.g., by inserting the lug 112 into the channel 114), the first identification element 190A can be aligned with a first detector 170A of the watch body 100, and the second identification element 190B can be aligned with a second detector 170B of the watch body 100.

It will be recognized that some detection mechanisms can consume more power or have other effects that would preferably be minimized. For example, the second detector 170B can, when operated, consume more power than the first detector 170A, when operated. In some embodiments, the first detector 170A detects the band 110 (e.g., by the first identification element 190A) in a manner that is different than a manner in which the second detector 170B detects the second identification element 190B to accommodate the differences in operation. For example, the first detector 170A can detect the band 110 on a more frequent basis than the second detector 170B detects the second identification element 190B. For example, the first detector 170A can be "always on" or otherwise be ready to detect the band 110 continuously or periodically. Upon detection of the band 110 by the first detector 170A, the watch can determine that the band 110 is present and infer that the second identification element 190B may also be present and available for detection. Based on the first detection, the second detector 170B can be activated to detect the second identification element 190B by any mechanisms described herein. By activating the second detector 170B only after detecting the presence of the band 110 with the first detector 170A, the operation of the second detector 170B can be limited to when it is needed. Additionally or alternatively, the second detector 170B can be deactivated upon detection that the band 110 is not present. Accordingly, power consumption by the second detector 170B can be reduced without losing an ability to detect the band 110 when present.

In some embodiments, the first detector 170A can detect the presence, attachment, and/or removal of the band 110 by detecting the first identification element 190A. For example, the first detector 170A can include a compass, magnetometer, Hall Effect sensor, and/or the like to detect a magnetic field from the first identification element 190A (e.g., a magnet). The magnet may be configured to indicate its presence without necessarily distinguishing the band 110 from other bands. For example, the magnet may lack a magnetic field characteristic that is distinct from other bands. However, the first detector 170A can be operated to detect the magnetic field and cause the second detector 170B to be activated.

In some embodiments, the first detector can detect the presence, attachment, and/or removal of the band without directly detecting a corresponding identification element. For example, the first detector 170A can include an accelerometer that detects acceleration and/or other movement-based activity of the watch. The insertion and/or removal of the band 110 by a user can be accompanied by movement that is detectable by the accelerometer. Accordingly, such movement (either in general or specific types of movement) can be understood to indicate insertion and/or removal of the band 110, and the second detector 170B can be activated accordingly.

By further example, the first detector 170A can include a proximity detector that detects when the watch is worn by a user. Such proximity detectors can detect the presence of the user's wrist, for example, at a rear side of the watch body 100. As the watch will typically not be worn while changing a band 110, the presence of the user's wrist can be understood to indicate that insertion and/or removal of the band 110 may not be occurring, and the second detector 170B can be deactivated accordingly. Furthermore, the absence of the wrist of the user can be understood to indicate that insertion and/or removal of the band 110 may be occurring, and the second detector 170B can be activated accordingly.

By further example, the first detector 170A can include a lug detector that detects when the band 110 is attached to the watch body 100. For example, such a lug detector can detect the presence of the lug 112 within the channel 114. The lug detector can include a beam (e.g., infrared) that is disrupted when the lug 112 is within the channel 114. Additionally or alternatively, the lug detector can include a proximity sensor, acoustic (e.g., ultrasound, LIDAR, sonar, etc.) sensor, or another sensor that detects the presence or absence of the lug 112. The absence of the lug 112 can be detected, and the second detector 170B can be deactivated accordingly. Furthermore, the presence of the lug 112 can be detected, and the second detector 170B can be activated accordingly.

By further example, the first detector 170A can include a microphone, voice coil, or the like to acoustically detect the insertion and/or removal of the band 110 from the watch body 100. For example, the insertion and/or removal of the lug 112 with respect to the channel 114 can make a sound, such as the engagement or release of a locking mechanism. The first detector 170A can detect the sound and determine that the band 110 has been inserted or removed.

Figure 12:
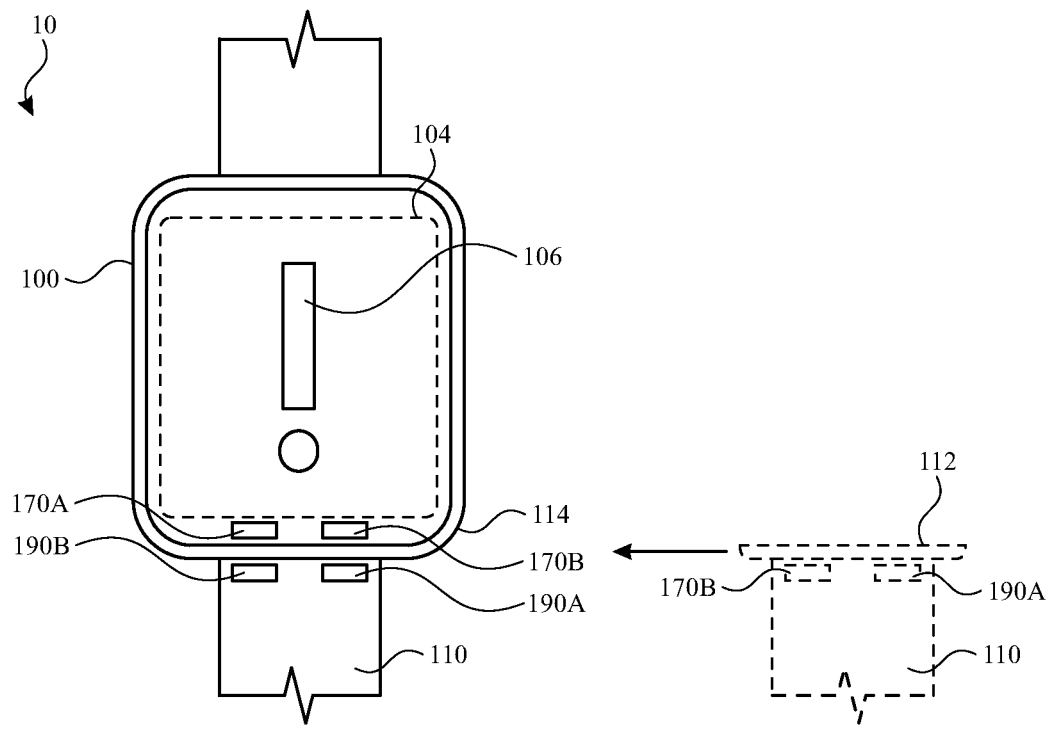
FIG. 12 illustrates a front view of the watch of FIG. 11 with the band in a second orientation for insertion into the watch body.

Referring now to FIGS. 11 and 12, the manner in which a band is attached to a watch body can be detected and verified, with corresponding output to a user where applicable. For example, the orientation, alignment, position, and/or other arrangement of a band relative to a watch body can be detected, and corresponding actions can be performed by the watch.

For example, as shown in FIG. 11, a band 110 can include a first identification element 190A and a second identification element 190B. When the band 110 is attached to the watch body 100 (e.g., by inserting the lug 112 into the channel 114) in a first orientation, the first identification element 190A can be aligned with a first detector 170A of the watch body 100, and the second identification element 190B can be aligned with a second detector 170B of the watch body 100. The first identification element 190A and the second identification element 190B can each have a distinct feature that is detectable by each of the first detector 170A and the second detector 170B. The watch body 100 can perform an action upon detection of both of the first identification element 190A and the second identification element 190B, as discussed herein.

By further example, the watch body 100 can detect the direction in which the band 110 (e.g., lug 112) is attached (e.g., inserted into channel 114). Either one of the first detector 170A or the second detector 170B can first detect the first identification element 190A or the second identification element 190B. Where the first identification element 190A is detected first, and the second identification element 190B is subsequently detected by the same detector, the direction of insertion or removal can be inferred. The output 106 can be based on the detected direction. For example, a visual feature of the output 106 can be animated to move onto, across, and/or off of an active area of the display 104 in the same direction as the direction of insertion or removal of the band.

As shown in FIG. 12, when the band 110 is attached to the watch body 100 in a second orientation, the first identification element 190A can be aligned with the second detector 170B of the watch body 100, and the second identification element 190B can be aligned with the first detector 170A of the watch body 100. Accordingly, the second orientation can be reversed with respect to the first orientation. Where the band 110 provides different features (e.g., aesthetic or functional) in different orientations, the watch body 100 can detect the orientation and perform a corresponding action. For example, the output 106 of the display 104 or another output can be different when the band 110 is in each of the different orientations. An example of one output is to prompt the user to change the orientation. Another example of an output can be to alter the display to include a visual feature corresponding to the exposed side of the band 110.

Figure 13:
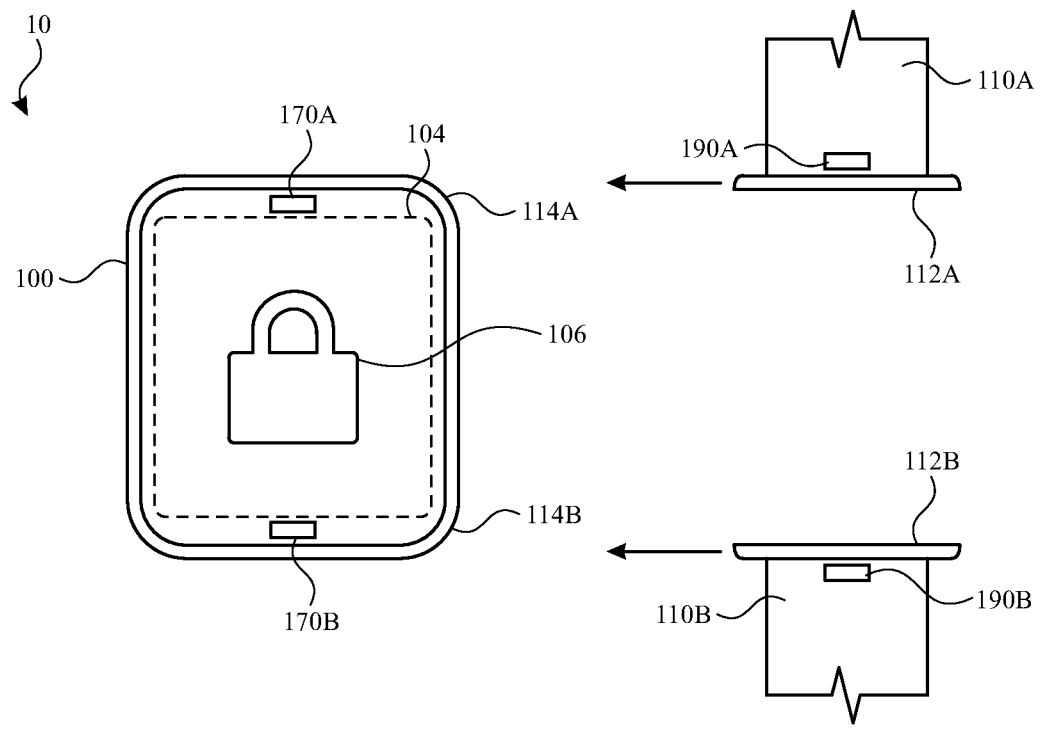
FIG. 13 illustrates a front view of a portion of a watch with first and second band portions prior to insertion into a watch body.
Figure 14:
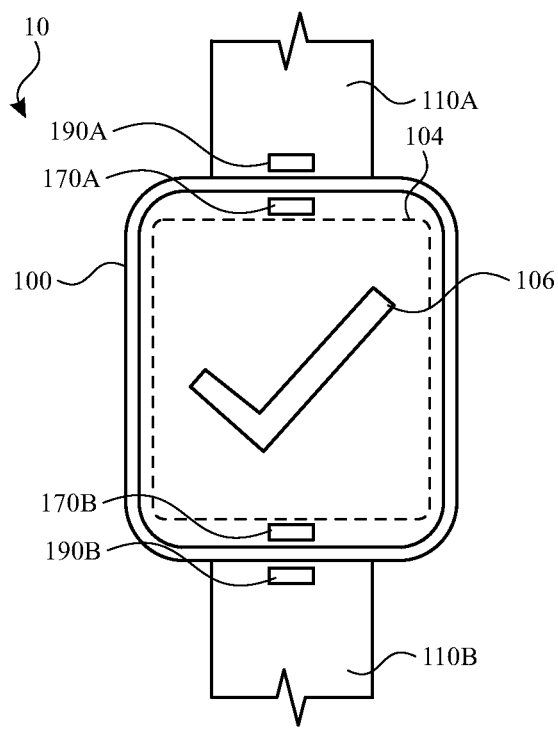
FIG. 14 illustrates a front view of the watch of FIG. 13 with the first and second band portions after insertion into the watch body.

Referring now to FIGS. 13-14, a watch can provide or prevent access to certain features based, at least in part, on a detected configuration of the band. For example, a watch can provide features for a duration of time while worn and require security credentials after a duration of time in which the watch is not worn.

As shown in FIG. 13, a first band portion 110A and a second band portion 110B can each be provided for attachment to a corresponding one of different (e.g., opposing) sides of the watch body 100 (e.g., at a given channel 114). When the band portions are not attached, the watch body 100 can provide an output 106. The output can exclude certain features of the watch body 100. As the watch will typically not be worn while changing a band 110, the absence of the band portions can indicate that the user is not wearing the band. Accordingly, the features of the watch can be limited so that content intended for only the authorized user is not made available. Other content can be made available, such as the time, date. Additionally or alternatively, the watch body can receive input from the user to allow entry of a passcode or other security credential (e.g., authentication by another device, biometric scan, etc.).

As shown in FIG. 14, a first detector 170A on a first side of the watch body 100 can detect a first identification element 190A of the first band portion 110A when attached, and/or a second detector 170B on a second side of the watch body 100 can detect a second identification element 190B of the second band portion 110B when attached. Based on and in response to these detections, the watch body can perform an action, such as providing an output 106, which may be different than the output when the band portions are not detected. For example, the output 106 can include a prompt for the user to provide a security credential, such as a passcode. By further example, watch body can perform actions to automatically authenticate a user wearing the watch. Additional features can be made available upon entry of a passcode or other security credential (e.g., authentication by another device, biometric scan, etc.).

Figure 15:
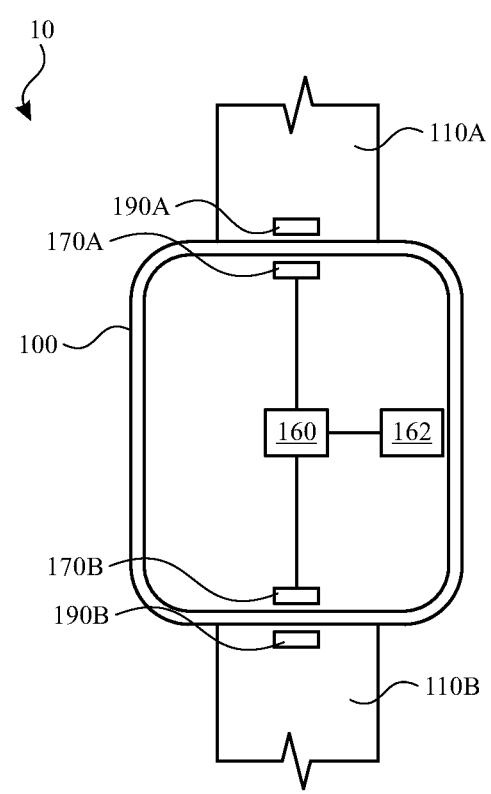
FIG. 15 illustrates a front view of a portion of a watch with a multiplexer for managing operation of multiple antennas.

Referring now to FIG. 15, one or more identification elements 190 can be provided at or near the ends of the band 110 (i.e., first band portion 110A and second band portion 110B) and near the watch body 100. The first detector 170A, the second detector 170B, and/or a communication element 160 can include one or more antennas (e.g., coils, etc.) for wireless communication. Likewise, the first identification element 190A and the second identification element 190B can include one or more antennas (e.g., coils, etc.) for wireless communication.

As shown in FIG. 15, each of the first identification element 190A and the second identification element 190B can be positioned (e.g., at or near a lug) to be aligned with and in close proximity to a corresponding one of the first detector 170A and the second detector 170B (e.g., at or near a channel) of the watch body 100 when the first band portion 110A and second band portion 110B are connected to the watch body 100. Where the band 110 has multiple (e.g., two) connections to the watch body 100, a detector 170 can be provided near each connection so that each of the first identification element 190A and the second identification element 190B is independently detected regardless of which connection is used. As such, separate identification elements of separate band portions can be independently detected. It will be recognized that a single detector can be used, for example to detect only one of the identification elements. Additionally or alternatively, a detector can be provided other than at a location for attaching a band. For example, one or more detectors can be provided for other purposes, as described further herein.

One or more additional detectors 162 can be positioned at other locations and used for other purposes (e.g., secure payment with NFC-enabled transmissions). Where multiple detectors are used, an arrangement such the one shown in FIG. 15 can connect each of the first detector 170A and the second detector 170B to the same receiving and transmitting components of the communication element 160. Multiplexing techniques can be used to manage communications with each of the first detector 170A and the second detector 170B. Furthermore, the first detector 170A and the second detector 170B, which can optionally include an NFC radio, can also be used for other purposes. For example, external and/or internal switches and/or multiplexers can be provided for the multiplexing of more than one antenna to a transceiver of the communication element 160. Detection of bands can be performed with at least some of the same components that provide communication with other devices, such as for data communication and/or financial transactions. It will be recognized that various arrangements can be provided to accomplish the multiple communication modes described herein. The detection can be contactless (e.g., non-conductive) so that the components can be protected from Galvanic corrosion that may occur in a contact-based arrangement. The detection can also be autonomous, such that user intervention or explicit operations are not required. Additionally, the detection can be performed without requiring the band to provide its own power source. It will be recognized that a variety of other configurations are contemplated to provide wireless communication for detection of the identification elements of the band.

Accordingly, watch bands described herein can facilitate a watch's ability to perform one or more operations based on the detected characteristic and configuration of the watch band. Characteristics of the watch band can change when placed in different configurations, and each of these characteristics can be correlated with each of the various configurations. The characteristics can be measured to detect in which of the various configurations the watch band is in.

Various examples of aspects of the disclosure are described below as clauses for convenience. These are provided as examples, and do not limit the subject technology.

Clause A: a watch comprising: a watch body comprising: a processor; a first detector; and a second detector; and a band that is attachable to the watch body for securing the watch to a user and comprising an identification element, wherein the processor is configured to: operate the first detector to detect a presence of the band; and based on a detection of the presence of the band, operate the second detector to detect the identification element.

Clause B: a watch comprising: a watch body comprising: a processor; a first detector; and a second detector; and a band that is attachable to the watch body, the band comprising: a first identification element; and a second identification element, wherein the processor is configured to: operate the first detector to detect the first identification element or the second identification element; operate the second detector to detect the first identification element or the second identification element; perform a first action when the first identification element is detected by the first detector and the second identification element is detected by the second detector; and perform a second action, different than the first action, when the first identification element is detected by the second detector and the second identification element is detected by the first detector.

Clause C: a system comprising: a watch body comprising: a processor; a first detector on a first side of the watch body; and a second detector on a second side of the watch body; and a band that is attachable to the watch body, the band comprising: a first band portion comprising a first identification element; a second band portion comprising a second identification element; and a third band portion comprising a third identification element, wherein the processor is configured to: operate the first detector to detect the first identification element, the second identification element, or the third identification element; operate the second detector to detect the first identification element, the second identification element, or the third identification element; perform a first action when the first identification element and the second identification element are detected; and perform a second action, different than the first action and the second action, when the first identification element and the third identification element are detected; and perform a third action, different than the first action, the second action, and the third action, when the second identification element and the third identification element are detected.

One or more of the above clauses can include one or more of the features described below. It is noted that any of the following clauses may be combined in any combination with each other, and placed into a respective independent clause, e.g., clause A, B, or C.

Clause 1: the identification element corresponds to a characteristic of the band; and the processor is configured to determine whether to execute an action based on the detected identification element.

Clause 2: the watch body further comprises a display; the characteristic of the band is a color of the band; and the action is changing a feature on the display to include the color.

Clause 3: the presence of the band is detected based on a position, orientation, or movement of the band with respect to the watch body.

Clause 4: the first detector comprises a magnetic field sensor, wherein the presence of the band is detected based on a magnetic field generated by a magnet of the band.

Clause 5: the identification element comprises a pattern on a surface of the band; and the second detector comprises an optical sensor configured to detect the pattern.

Clause 6: the identification element comprises a magnet; and the second detector comprises a magnetic field sensor configured to detect the magnet.

Clause 7: the second detector comprises an antenna configured to communicate with the identification element.

Clause 8: a power consumption of the first detector when operated is lower than a power consumption of the second detector when operated.

Clause 9: the identification element corresponds to a characteristic of the band; and the processor is configured to determine whether to execute an action based on the detected identification element.

Clause 10: the watch body further comprises a display; the characteristic of the band is a color of the band; and the action is changing a feature on the display to include the color.

Clause 11: the watch body further comprises a channel for receiving a lug of the band; the identification element is positioned at the lug of the band; the first detector is arranged to detect the presence of the band when the lug of the band is received into the channel; and the second detector is arranged to detect the identification element when the lug of the band is received into the channel.

Clause 12: the watch body further comprises a channel for receiving a lug of the band; and the first identification element and the second identification element are positioned at the lug of the band.

Clause 13: the first detector is arranged to detect: the first identification element when the lug is received into the channel in a first orientation; or the second identification element when the lug is received into the channel in a second orientation; and the second detector is arranged to detect: the second identification element when the lug is received into the channel in the first orientation; or the first identification element when the lug is received into the channel in the second orientation.

Clause 14: the band comprises: a first band portion comprising the first identification element; and a second band portion comprising the second identification element; the first detector is positioned on a first side of the watch body; and the second detector is positioned on a second side of the watch body, opposite the first side.

Clause 15: the first identification element corresponds to a first color of the first band portion; the second identification element corresponds to a second color of the second band portion; the third identification element corresponds to a third color of the third band portion; the watch body further comprises a display; the first action comprises changing a feature on the display to include the first color and the second color; the second action comprises changing the feature on the display to include the first color and the third color; and the third action comprises changing the feature on the display to include the second color and the third color.

Clause 16: the first action comprises providing access to a first feature that is available only when the first identification element and the second identification element are detected; the second action comprises providing access to a second feature that is available only when the first identification element and the third identification element are detected; and the third action comprises providing access to a third feature that is available only when the second identification element and the third identification element are detected.

Clause 17: the processor is further configured to: cease the first action when removal of the first identification element or the second identification element is detected; cease the second action when removal of the first identification element or the third identification element is detected; and cease the third action when removal of the second identification element or the third identification element is detected.

As described above, one aspect of the present technology may include the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A watch comprising:
a watch body comprising:
 a processor;
 a first detector; and
 a second detector; and
a band that is attachable to the watch body for securing the watch to a user and comprising an identification element,
wherein the processor is configured to:
 operate the first detector to detect whether the band is present at the watch body;
 in response to a detection that the band is not present at the watch body, deactivate the second detector; and
 in response to a detection that the band is present at the watch body, activate the second detector to detect the identification element.

2. The watch of claim 1, wherein:
the identification element corresponds to a characteristic of the band; and
the processor is configured to determine whether to execute an action based on the detected identification element.

3. The watch of claim 2, wherein:
the watch body further comprises a display;
the characteristic of the band is a color of the band; and
the action is changing a feature on the display to include the color.

4. The watch of claim 1, wherein a presence of the band is detected based on a position, orientation, or movement of the band with respect to the watch body.

5. The watch of claim 1, wherein the first detector comprises a magnetic field sensor, wherein a presence of the band is detected based on a magnetic field generated by a magnet of the band.

6. The watch of claim 1, wherein:
the identification element comprises a pattern on a surface of the band; and
the second detector comprises an optical sensor configured to detect the pattern.

7. The watch of claim 1, wherein:
the identification element comprises a magnet; and
the second detector comprises a magnetic field sensor configured to detect the magnet.

8. The watch of claim 1, wherein the second detector comprises an antenna configured to communicate with the identification element.

9. The watch of claim 1, wherein a power consumption of the first detector when operated is lower than a power consumption of the second detector when operated.

10. The watch of claim 1, wherein:
the watch body further comprises a channel for receiving a lug of the band;
the identification element is positioned at the lug of the band;
the first detector is arranged to detect a presence of the band when the lug of the band is received into the channel; and
the second detector is arranged to detect the identification element when the lug of the band is received into the channel.

11. A watch comprising:
a watch body comprising:
 a processor;
 a display;
 a first detector; and
 a second detector; and
a band that is attachable to the watch body, the band comprising:
 a first identification element; and
 a second identification element,
wherein the processor is configured to:
 operate the first detector to detect the first identification element or the second identification element;
 operate the second detector to detect the first identification element or the second identification element;
 output, via the display, a first output when the first identification element is detected by the first detector and the second identification element is detected by the second detector simultaneously; and
 output, via the display, a second output, different than the first output, when the first identification element is detected by the second detector and the second identification element is detected by the first detector.

12. The watch of claim 11, wherein:
the watch body further comprises a channel for receiving a lug of the band; and
the first identification element and the second identification element are positioned at the lug of the band.

13. The watch of claim 12, wherein:
the first detector is arranged to detect:
    the first identification element when the lug is received into the channel in a first orientation; or
    the second identification element when the lug is received into the channel in a second orientation; and
the second detector is arranged to detect:
    the second identification element when the lug is received into the channel in the first orientation; or
    the first identification element when the lug is received into the channel in the second orientation.

14. The watch of claim 11, wherein:
the band comprises:
    a first band portion comprising the first identification element; and
    a second band portion comprising the second identification element;
    the first detector is positioned on a first side of the watch body; and
the second detector is positioned on a second side of the watch body, opposite the first side.

15. A system comprising:
a watch body comprising:
    a processor;
    a display:
    a first detector on a first side of the watch body; and
    a second detector on a second side of the watch body; and
a band that is attachable to the watch body, the band comprising:
    a first band portion comprising a first identification element;
    a second band portion comprising a second identification element; and
    a third band portion comprising a third identification element,
wherein the processor is configured to:
    operate the first detector to detect the first identification element, the second identification element, or the third identification element;
    operate the second detector to detect the first identification element, the second identification element, or the third identification element;
    output, via the display, a first output when the first identification element and the second identification element are detected simultaneously;
    output, via the display, a second output, different than the first output, when the first identification element and the third identification element are detected simultaneously; and
    output, via the display, a third output, different than the first output and the second output, when the second identification element and the third identification element are detected simultaneously.

16. The system of claim 15, wherein:
the first identification element corresponds to a first color of the first band portion;
the second identification element corresponds to a second color of the second band portion;
the third identification element corresponds to a third color of the third band portion;
the first output comprises changing a feature on the display to include the first color and the second color;
the second output comprises changing the feature on the display to include the first color and the third color; and
the third output comprises changing the feature on the display to include the second color and the third color.

17. The system of claim 15, wherein the processor is further configured to:
    provide access to a first feature that is available only when the first identification element and the second identification element are detected simultaneously;
    provide access to a second feature that is available only when the first identification element and the third identification element are detected simultaneously; and
    provide access to a third feature that is available only when the second identification element and the third identification element are detected simultaneously.

18. The system of claim 15, wherein the processor is further configured to:
    cease the first output when removal of the first identification element or the second identification element is detected;
    cease the second output when removal of the first identification element or the third identification element is detected; and
    cease the third output when removal of the second identification element or the third identification element is detected.

* * * * *